United States Patent
Jurkat

(10) Patent No.: US 8,190,300 B2
(45) Date of Patent: May 29, 2012

(54) METHOD FOR THE OPERATION OF A WIND FARM

(75) Inventor: Mark Jurkat, Norderstedt (DE)

(73) Assignee: Nordex Energy GmbH, Norderstedt (DE)

(*) Notice: Subject to any disclaimer, the term of this patent is extended or adjusted under 35 U.S.C. 154(b) by 402 days.

(21) Appl. No.: 12/435,070

(22) Filed: May 4, 2009

(65) Prior Publication Data

US 2010/0191384 A1   Jul. 29, 2010

(30) Foreign Application Priority Data

Jan. 29, 2009   (DE) .................. 10 2009 006 671

(51) Int. Cl.
  G05D 3/12   (2006.01)
  F03D 9/00   (2006.01)
  G01L 1/00   (2006.01)

(52) U.S. Cl. ............. 700/287; 290/44; 702/44; 700/298

(58) Field of Classification Search .................. 700/287; 290/44; 702/44
  See application file for complete search history.

(56) References Cited

U.S. PATENT DOCUMENTS

| | | | |
|---|---|---|---|
| 7,613,548 B2 * | 11/2009 | Cardinal et al. | 700/286 |
| 7,826,908 B2 * | 11/2010 | Cheng et al. | 700/44 |
| 2006/0132993 A1 | 6/2006 | Delmerico et al. | |
| 2007/0001461 A1 * | 1/2007 | Hopewell | 290/44 |
| 2007/0038335 A1 * | 2/2007 | McIntyre et al. | 700/295 |
| 2007/0055392 A1 * | 3/2007 | D'Amato et al. | 700/44 |
| 2007/0090651 A1 * | 4/2007 | Wobben | 290/44 |
| 2007/0124025 A1 * | 5/2007 | Schram et al. | 700/287 |
| 2007/0173982 A1 | 7/2007 | Cardinal et al. | |
| 2010/0057267 A1 * | 3/2010 | Liu et al. | 700/297 |

FOREIGN PATENT DOCUMENTS

EP    1 672 779 A2    12/2006

* cited by examiner

*Primary Examiner* — Albert Decady
*Assistant Examiner* — Darrin Dunn
(74) *Attorney, Agent, or Firm* — Vidas, Arrett & Steinkraus, P.A.

(57) ABSTRACT

A method for the operation of a wind farm having two or more wind energy plants, which has a farm control which presets a desired value for an electric variable of the wind farm which has to be generated, wherein the farm control calculates an average increase of the real values of the electric variable for at least one time interval continuously, and compares it with a maximum value for the increase of the electric variable in the respective time interval, the farm control determines a proposal of a desired value for each predetermined time interval, based on a real value of the electric variable which was averaged continuously over the time interval, and in the case that the average increase in the at least one time interval is smaller than the maximum value in the corresponding time interval, the farm control determines a new desired value of the electric variable of the wind farm, with a selection of the desired value as the smallest of several proposals for a desired value.

9 Claims, 2 Drawing Sheets

METHOD FOR THE OPERATION OF A WIND FARM

CROSS-REFERENCE TO RELATED APPLICATIONS

Figure 1:
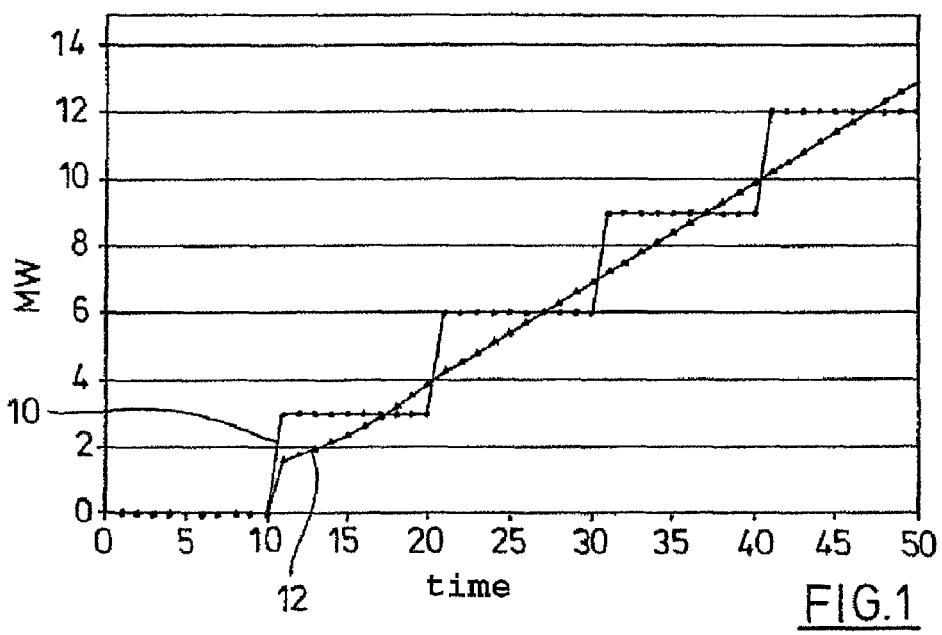

Not applicable.

STATEMENT REGARDING FEDERALLY SPONSORED RESEARCH

Not applicable.

BACKGROUND OF THE INVENTION

The present invention is related to a method for the operation of a wind farm having two or more wind energy plants.

For the connection of wind farms to the electric mains grid, there are a plurality of grid connection regulations, which partly contain requirements and limitations for the supplied power. So-called increase limitations may also be provided in the performance requirements, which preset to a wind farm in which degree the supplied power can be increased or decreased. Concretely speaking this means that when the wind farm starts or the supply of wind increases, the power must not increase as rapidly as would be technically possible for the wind farm, but must be limited by one or plural increase ramps. In a concrete case, this may be 3.0 MW/min to the maximum and 20 MW/10 min to the maximum, for instance, wherein the increase of 3.0 MW per minute refers to the value averaged over one minute, as well as the increase of 20 megawatt refers to the average value over 10 minutes. This means that the maximum power increase of the wind farm is permitted to be 3.0 MW in one minute, but at the same time, the power increase is not permitted to be more than 20 megawatt during a period of 10 minutes.

From US 2007/0173982 A1, the entire contents of which is incorporated herein by reference, a system and a method for the control of a power increase is known. In a first alternative, starting from a power in the time point t=0, a power for the time point t=n is calculated by multiplying an initial increase limitation with the time duration and adding it to the instantaneous power value. In an alternative embodiment, a field of n power values is calculated, wherein each of the power values is calculated via the initial gradient limitation based on a starting value. By a minimum formation over the field of the future power values, a future desired value for the power is calculated. In another known method, the same consideration, which was made for future power values, is partly retrospectively performed for the past.

From EP 1 672 779 A2, the entire contents of which is incorporated herein by reference, an apparatus and a method for controlling the gradient increase is known, in which the power increase for a wind farm is controlled based on the power increase of the individual wind energy plants in the wind farm.

The present invention is based on the objective to provide a method for the operation of a wind farm, in which a farm control presets a desired value for an electric variable of the wind farm to be generated, so that a continuous increase of the electric variable takes place, and a step-like or kinked increase of the electric variable is avoided.

BRIEF SUMMARY OF THE INVENTION

The method of the present invention serves for the operation of a wind farm having two or more wind energy plants. The wind farm has a farm control, which presets a desired value for an electric variable of the wind farm that has to be generated. In the method of the present invention, the farm control calculates an average increase of the real values of the electric variable continuously for at least one time interval. Further, the farm control compares the calculated average increase of the real values of the electric variable for a time interval with a maximum value for the increase of the electric variable in the corresponding time interval. In the method of the present invention, one, two or plural time intervals are used, for which the average increase is calculated continuously and a maximum value of the increase is defined. The farm control determines a new desired value of the electric variable of the wind farm, when the average increases are smaller than the maximum value. In the case that plural time intervals are taken into consideration, a new desired value is determined then when all the average increases are smaller than the assigned maximum values in the time interval. For the case that the average increase in a time interval is already greater than the maximum value for the increase in a time interval, it is not necessary to determine a new desired value, because the wind farm has already exceeded the maximum value for the increase of the electric variable with its change. According to the present invention, the new desired value of the electric variable of the wind farm is determined from a selection of the desired values as the smallest of several proposals for a desired value. The proposals for a desired value are determined individually for each considered time interval by the farm control. In this, a proposal of a desired value is determined for each time interval, based on the real values of the electric variable averaged continuously over the time interval. In the method of the present invention, it is made reference to a real value that was continuously determined over the observed time interval in the determination of the proposal of a desired value, in order to achieve a continuous increase of the desired values of the electric variable and to comply with the preset maximum values at the same time. The present invention is based on the finding that by using the real value averaged continuously over the time interval, it can be avoided that a step-like increase of the desired values takes place or that the desired values form breaks. The method of the present invention leads to a continuous increase of the desired values.

In a preferred extension of the method of the present invention, the proposal of a desired value for the predetermined time interval is determined from the real values averaged over the time interval, plus the maximum value for the increase of the electric variable in the time interval multiplied by a gradient factor, wherein the gradient factor is greater than zero and smaller than one. In this, the gradient factor takes into account that when the maximum value for the increase of the electric variable would be summed up completely, a greater increase would result over the time interval. Thus, the gradient factor smaller than one ensures that an addition of the maximum value for the increase repeated plural times in the time interval does not lead to a strong increase of the real value.

In a further preferred embodiment, values for a maximum permissible change of the electric variable applied externally to the farm control can be considered as additional proposals for a desired value in the selection of the desired value. By always considering the minimum of the proposals for a desired value in the desired value selection, the limited increases of the electric variable, imposed on short notice by the energy supply company (ESC) for instance, can also be taken into account.

In a further preferred embodiment, the wind farm control apportions in addition the desired value for the electric variable of the wind farm to the at least two wind energy plants. In the apportionment of the desired values for the wind farm to the individual wind energy plants, the real value of the electric variable of the individual wind energy plants is preferably taken into account. Thus, it can be made sure that no desired value augmented over the rated range is preset to a wind energy plant in the wind farm, whose electric variable is for instance already near the rated range of the wind energy plant.

In a preferred embodiment, the gradient factor is a variable constant over time. It is also possible to choose the gradient factor depending on the length of the time interval that is observed.

In the method of the present invention, different variables can be observed for the electric variable of the wind farm. For instance, it is possible to consider an effective power, a reactive power, a power factor, a phase angle, a frequency or a voltage in an interconnection point between wind farm and electric mains grid. It is also possible to observe combinations of these variables.

In the method of the present invention, a continuously determined real value variable is used for the calculation of a proposal of a desired value. Through this, breaks and kinks in the desired values can be avoided, when the power of the wind farm increases. In this approach, it is advantageous that in a starting phase of the wind farm, in which the wind energy plants increase the generated electric variable with respect to a quasi-stationary state or a shut-down state, i.e. when there are still no real values dating back or the same are still not at hand for the complete observed time interval, an offset is added to each of the proposals for a desired value for the respective time interval. This offset in the starting phase of the operation of the wind farm makes sure that no too strong delay of the mean value occurs when the desired values are run up. In a preferred embodiment, it is provided that the offset decreases with increasing time duration since the beginning of the starting phase.

BRIEF DESCRIPTION OF EACH OF THE FIGURES OF THE DRAWINGS

A preferred embodiment of the method of the present invention is explained in more detail by means of an example in the following.

Figure 2:
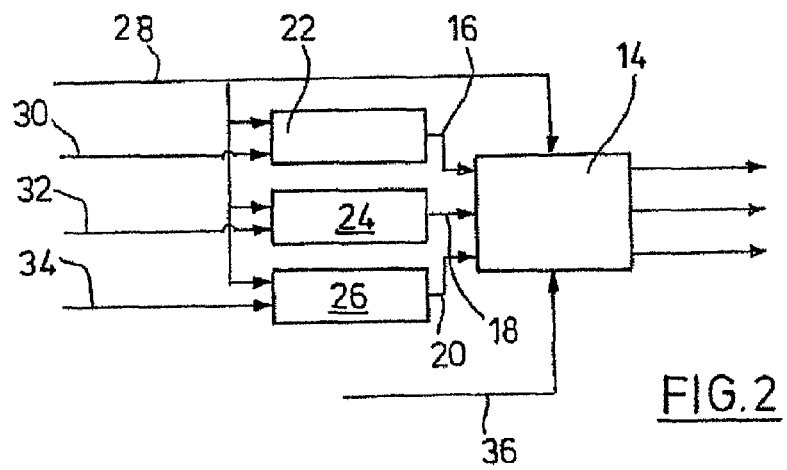
Figure 3:
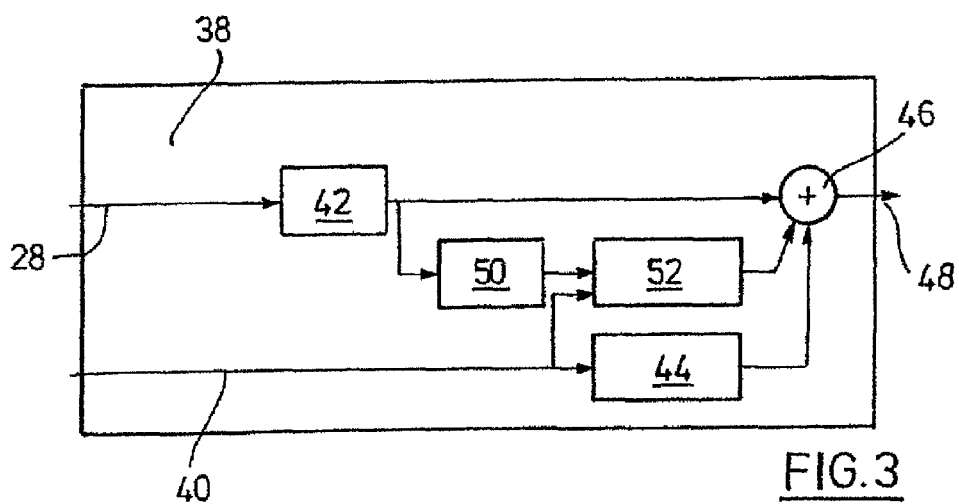
Figure 4A:
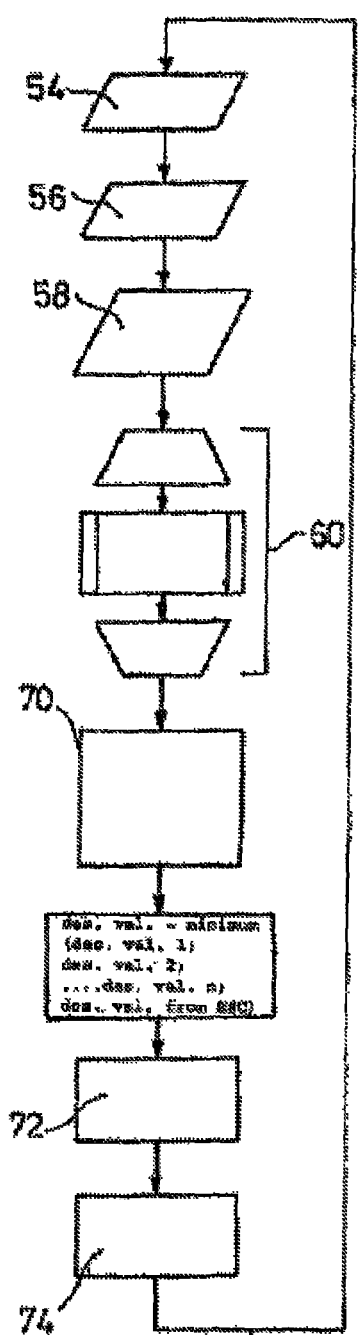
Figure 4B:
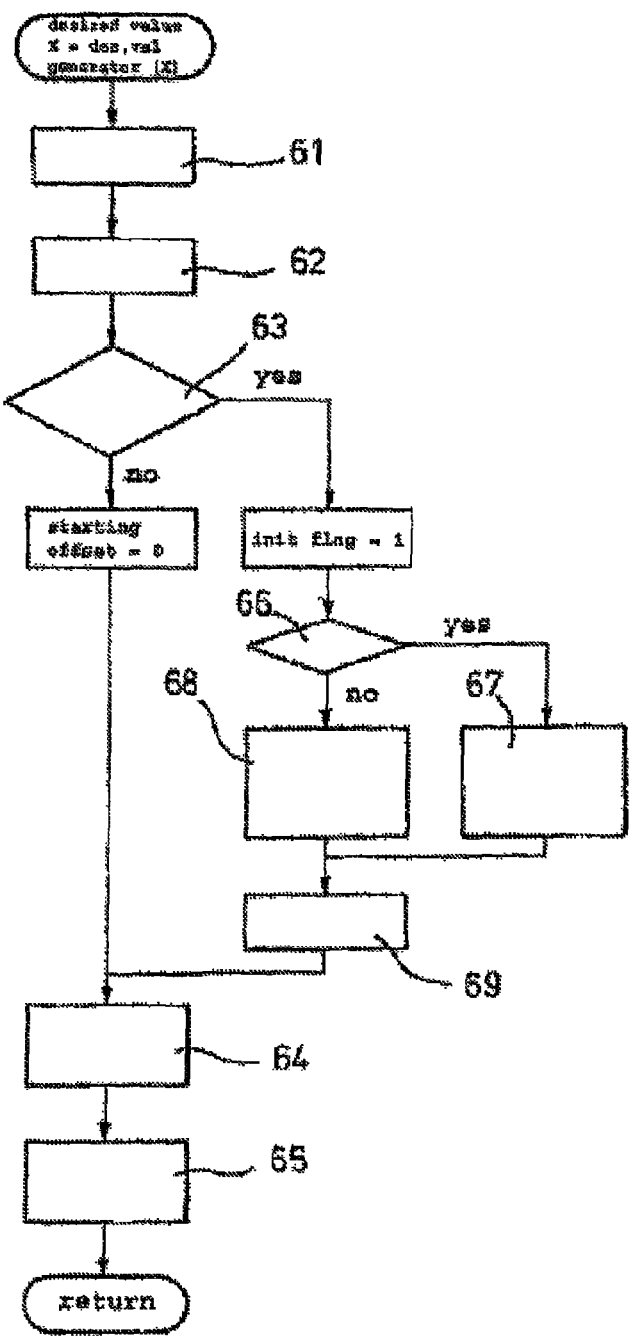

FIG. 1 shows the effective power provided by a wind farm in megawatt over the time, for the method of the present invention at the one hand and for a method of the state of the art on the other hand, FIG. 2 shows a block diagram for the determination of the desired value of the individual wind energy plants, FIG. 3 shows a block diagram for a desired value generator, and FIGS. 4a and 4b each show a process diagram for the method of the present invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

FIG. 1 shows the development in time of the desired values for the effective power to be fed, in an interconnection point of the wind farm. In the curve 10 formed by round points, the desired values are calculated according to a method of the state of the art. In doing so, the situation might occur that the maximum power increase for the wind farm is defined for a time interval of 10 minutes. Thus, when the wind farm can realise the increase of power in significantly less than 10 minutes, then the steps depicted in FIG. 1 are taking place. In the method of the present invention, whose desired value is represented by the triangles, the line 12 shows an approximately linear increase of the desired value curve. The jump in the beginning of the curve 12 shortly after starting the wind farm is generated by an additional offset, which will be explained in more detail below. Curve 12 is characterised in that breaks of the desired value curve are avoided.

FIG. 2 shows the calculation of the desired values for the wind energy plants WEA 1, WEA 2 to WEA n in a block diagram. For the calculation of the desired values for the individual wind energy plants, different proposals for a desired value 16 to 20 are applied to a desired value selector and a controller 14. The proposals for a desired value are generated by individual desired value generators 22 to 26. In this, the desired value generator 1 is not related to a desired value for the first wind energy plant, but instead to a proposal of a desired value for the complete wind farm, taking into account a first time interval. Thus, in the depicted example from FIG. 2, a first time interval, a second time interval, and with the desired value generator 26 a third time interval is observed.

The actual value of the effective power 28 is applied to each desired value generator. Further, a desired value for a gradient is applied to each desired value generator 22 to 26. In this, the desired values for a gradient 30 to 34 preset the maximum permissible increase for the mean value of the corresponding time interval. For instance, desired value for a gradient 1 presets a value of 3.0 MW per mean value of 1 minute, whereas desired value for a gradient 2 presets a value of 20 MW per mean value of 10 minutes. Each desired value generator 22 to 26 calculates a proposal of a desired value, which indicates a desired value of the complete wind farm for a corresponding time interval.

In the desired value selection 14 and the associated controller, the smallest values are selected from the proposals for a desired value 16, 18, 20. In a further step, except the selected desired value for the wind farm, the desired values for the individual wind energy plants are determined. In this, the real values of the individual wind energy plants (not depicted) are taken into account, in order to determine desired values for the individual wind energy plants in this way.

In the determination of the desired value for the wind farm, based on the proposals for a desired value 16, 18, 20, other desired value limitations 36 can also be taken into account in the desired value selection. For instance, it is possible that an energy supply company (ESC) presets desired value limitations 36 in addition, which are taken into account in the selection of the desired values.

FIG. 3 shows a desired value generator in detail. The real value of the effective power 28 and a desired value for a gradient 40 are applied to the desired value generator 38, the latter corresponds to one of the desired value generators 22, 24 or 26 from FIG. 2. From the real value of the effective power 28, a mean value for the time interval for which the desired value generator is provided is determined in a first step. In the regular operation of the wind farm, the applied desired value for a gradient 40 is multiplied by a gradient factor 44 in addition, and the formed mean value is added to the product in 46. The output of the desired value generator 38 is then a proposal of a desired value 48. A mean value gradient 50 is calculated from the formed mean value 42. The mean value gradient is the change of the mean value over the observed time interval. The offset function 52 is then formed from the mean value gradient and the desired value for a gradient 40. The result of the offset function 52 is summed up together with the result of the multiplication by the gradient factor 44 in step 46, and thus combinedly it forms the proposal of a desired value 48. The determination of the offset function is described in detail FIG. 4 for step 60.

FIG. 4a shows the method of the present invention in the overall course of the method. In a first step 54, the parameters of the method are read in. In a subsequent step 56, the real values of the power, and in step 58 the values for the power desired by the electricity company are read in. In step 58, even the maximum desired gradient values, which are preset by the electricity company, are read in at the same time. In a subsequent step 60, one proposal of a desired value is formed for each one of the observed time intervals 1 to n. The generation of the desired value is shown in detail in FIG. 4b. For this purpose, the mean value over the observed time interval is formed in step 61. In step 62, the real value of the increase for the time interval is formed from the generated mean value for the time interval. In step 63, it is requested whether the real value of the gradient for the predetermined time interval is smaller than a predefined starting value, or whether a starting offset is greater than zero. For the case that the real value of the gradient for the time interval is greater than a starting value or that the starting offset is zero, an init flag is set, and in step 64 the gradient offset is calculated from the desired value gradient multiplied by the gradient factor. The new proposal of a desired value for the time interval results then in step 65 from the mean value plus the pre-calculated gradient offset for the time interval. For this purpose, the starting offset for the time interval is additionally added in step 65, which is admittedly zero in the observed case.

However, when it is determined in the request 63 that one of the conditions is satisfied, a starting phase is at hand. In the starting phase, a starting offset for the calculation of the proposal of a desired value in step 65 is calculated in addition. For this purpose, by requesting an init flag, it is at first checked in step 66 whether a first calculation of the starting offset takes place. In this case, the starting offset for the time interval is formed in step 67 from the desired value gradient multiplied by a starting offset factor for the time interval. When there is no first calculation of the starting offset, the starting offset from the past run in step 68 is reduced. For this purpose, a certain value is subtracted from the starting offset. The value which must be subtracted results from the desired value gradient multiplied by the starting offset factor for the observed time interval, divided by a decay number for the time interval. As a result, the reduction step 68 has the consequence that in the course of time, the value of the starting offset for the time interval is reduced gradually. In a subsequent step 69, it is made sure that no negative starting offset is used in the further process. The calculation of the starting offset takes place by the procedural steps 64 and 65, wherein now, a value for the starting offset for the proposal of a desired value is calculated in addition in the procedural step 65.

In the procedural step 70, the minimum of the proposals for a desired value calculated in procedural step 60 is formed. In this, desired value presettings for the limitation of the wind farm from the energy supply company (ESC) are also taken into consideration. In a subsequent step 72, the control variable for the wind farm is determined by performing a comparison of desired and real values. In a subsequent step 74 follows an apportionment of the control variables from the wind farm to individual wind energy plants. Then, the individual wind energy plants regulate independently from each other to the desired value preset for them. Via the branch 76, the method reverts into its starting condition and is then repeated in a cyclic way.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for operating a wind farm having two or more wind energy plants, which has a farm control which presets a desired value for an electric variable of the wind farm to be generated, wherein
    the farm control continuously calculates an average increase of an actual value of the electric variable for at least one predetermined time interval and compares it with a maximum value of the electric variable in the predetermined time interval,
    the farm control determines a new desired value of the electric variable, if the average increase of the actual values of the electric variable was lower than the maximum value of the electric variable in each of the predetermined time intervals by
    determining a proposal for a desired value for each predetermined time interval from the actual values averaged over the predetermined time interval, plus the maximum value for an increase of the electric variable in the predetermined time interval multiplied by a gradient factor, wherein the gradient factor is greater than zero and smaller than one, and selecting the new desired value of the electric variable as the a minimum of plural proposals for the desired value.

2. The method according to claim 1, characterised in that values for a maximum permissible change of the electric variable applied externally to the farm control are considered as additional proposals for a desired value in the selection of the desired value.

3. The method according to claim 1, characterised in that in addition, the wind farm control apportions the desired value for the electric variable of the wind farm to the at least two wind energy plants.

4. The method according to claim 3, characterized in that the apportionment of the desired value to the two or more wind energy plants takes place depending on the actual value of the electric variable of the individual wind energy plants.

5. The method according to claim 1, characterised in that the gradient factor is constant.

6. The method according to claim 1, characterized in that the gradient factor depends on a length of the time interval.

7. The method according to claim 1, characterised in that the electric variable is selected from the group consisting of: effective power, reactive power, apparent power, effective current, reactive current, apparent current, power factor, phase angle, frequency or voltage in an interconnection point between wind farm and electric mains grid.

8. The method according to claim 1, characterised in that in a starting phase of the wind farm, an offset is added to each of the proposals for a desired value for the time intervals.

9. The method according to claim 8, characterised in that the offset decreases with increasing time duration since the beginning of the starting phase.

* * * * *